(12) United States Patent
Lien et al.

(10) Patent No.: US 9,749,004 B2
(45) Date of Patent: Aug. 29, 2017

(54) TRANSCEIVER AND OPERATION METHOD THEREOF

(71) Applicant: Novatek Microelectronics Corp., Hsinchu (TW)

(72) Inventors: Yu-Chang Lien, Taipei (TW); Chiao-Wei Hsiao, Taichung (TW); Yu-Hsuan Lin, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 375 days.

(21) Appl. No.: 14/542,671

(22) Filed: Nov. 17, 2014

(65) Prior Publication Data

US 2016/0072593 A1    Mar. 10, 2016

(30) Foreign Application Priority Data

Sep. 9, 2014 (TW) .............................. 103130989 A

(51) Int. Cl.
*H04B 1/52* (2015.01)
*H04B 1/525* (2015.01)

(52) U.S. Cl.
CPC .................................... *H04B 1/525* (2013.01)

(58) Field of Classification Search
CPC ........... H04B 15/02; H04B 1/40; H04B 1/525
See application file for complete search history.

(56) References Cited

U.S. PATENT DOCUMENTS

| | | | | |
|---|---|---|---|---|
| 5,325,355 A * | 6/1994 | Oprescu | ..................... | H04L 5/16 326/86 |
| 5,327,580 A * | 7/1994 | Vignali | .................... | H04B 7/24 340/7.21 |
| 5,424,657 A * | 6/1995 | Van Brunt | ................ | H04L 5/16 326/63 |
| 5,696,777 A | 12/1997 | Hofsaess | | |
| 7,242,227 B2 | 7/2007 | Pauletti et al. | | |
| 8,009,785 B2 * | 8/2011 | Au | ........................ | H03L 7/0895 327/148 |
| 8,559,283 B1 * | 10/2013 | Liu | .................. | G11B 20/10046 369/44.35 |
| 8,837,539 B1 * | 9/2014 | Sun | ..................... | H01S 5/06808 372/29.01 |
| 9,344,309 B2 * | 5/2016 | Shimizu | .................. | H04L 27/06 |
| 9,459,327 B2 * | 10/2016 | Ishikawa | ............ | G01R 31/3658 |
| 9,473,194 B2 * | 10/2016 | Domino | .................... | H04B 1/40 |

OTHER PUBLICATIONS

"Office Action of Taiwan Counterpart Application", issued on May 4, 2016, p. 1-p. 9, in which the listed references were cited.

* cited by examiner

*Primary Examiner* — Lewis West
(74) *Attorney, Agent, or Firm* — Jianq Chyun IP Office

(57) ABSTRACT

A transceiver and an operation method thereof are provided. The transceiver includes a transmitter and a receiver. The transmitter is configured to receive an output reference signal to provide an output signal to a signal channel. The receiver is coupled to the signal channel to receive a receiving reference signal to provide a receiving signal. The receiver includes a comparator unit and a signal adjusting unit. The comparator unit is configured to compare a first signal and a second signal to obtain the receiving signal. The signal adjusting unit is coupled between the output reference signal, the receiving reference signal and the comparator unit to adjust a voltage level of at least one of the output reference signal and the receiving reference signal to obtain the first signal and the second signal.

33 Claims, 4 Drawing Sheets

TRANSCEIVER AND OPERATION METHOD THEREOF

CROSS-REFERENCE TO RELATED APPLICATION

This application claims the priority benefit of Taiwan application serial no. 103130989, filed on Sep. 9, 2014. The entirety of the above-mentioned patent application is hereby incorporated by reference herein and made a part of this specification.

BACKGROUND OF THE INVENTION

1. Field of the Invention

The invention relates to a transceiver, and particularly relates to a transceiver and an operation method thereof.

2. Description of Related Art

Transceivers are commonly used in the electronic products nowadays. For example, input facilities, such as Blu-ray players or amplifiers, output facilities, such as TVs, projectors or sound system, all use transceivers. However, some issues may arise in the two-way channel connecting the facilities when signals that are too similar are input or output at the same time. The conventional transceiver usually uses a subtractor to prepare matching signals. However, if the subtractor is not sufficiently accurate or the signals are too similar, an issue of distortion is likely to arise. Namely, interference of noises caused by glitches or residuals of subtraction may be rendered.

SUMMARY OF THE INVENTION

The invention provides a transceiver and an operation method thereof capable of reducing influences of noises on judgment of a receiving signal.

A transceiver of the invention includes a transmitter and a receiver. The transmitter is configured to receive an output reference signal, so as to provide an output signal to a signal channel. The receiver is coupled to the signal channel to receive a receiving reference signal, so as to provide a receiving signal. The receiver includes a comparator unit and a signal adjusting unit. The comparator unit is configured to compare a first signal and a second signal to obtain the receiving signal. The signal adjusting unit is coupled between the output reference signal, the receiving reference signal, and the comparator unit to adjust a voltage level of at least one of the output reference signal and the receiving reference signal, thereby obtaining the first signal and the second signal.

An operation method of a transceiver of the invention includes steps as follows: receiving an output reference signal by using a transmitter to provide an output signal to a signal channel; comparing a first signal and a second signal by using a comparator unit of a receiver, so as to provide a receiving signal in correspondence with a receiving reference signal received from the signal channel; and adjusting a voltage level of at least one of the output reference signal and the receiving reference signal by using a signal adjusting unit of the receiver to obtain the first signal and the second signal.

According to an embodiment of the invention, the signal adjusting unit is configured to increase the output reference signal for a first voltage and then use the output reference signal as the first signal and transmit the receiving reference signal as the second signal.

According to an embodiment of the invention, the signal adjusting unit includes a first adder. A first input end of the first adder receives the first voltage, a second input end of the first adder receives the output reference signal, and an output end of the first adder provides the first signal.

According to an embodiment of the invention, the signal adjusting unit is configured to transmit the output reference signal as the first signal, and decrease the receiving reference signal for a second voltage and then use the receiving reference signal as the second signal.

According to an embodiment of the invention, the signal adjusting unit includes a first subtractor. A first input end of the first subtractor receives the second voltage, a second input end of the first subtracter receives the receiving reference signal, and an output end of the first subtracter provides the second signal.

According to an embodiment of the invention, the signal adjusting unit is configured to increase the output reference signal for a third voltage and then use the output reference signal as the first signal, and increase the receiving reference signal for a fourth voltage and then use the receiving reference signal as the second signal, the third voltage being higher than the fourth voltage.

According to an embodiment of the invention, the signal adjusting unit includes a second adder and a third adder. A first input end of the second adder receives the third voltage, a second input end of the second adder receives the output reference signal, and an output end of the second adder provides the first signal. A first input end of the third adder receives the fourth voltage, a second input end of the third adder receives the receiving reference signal, and an output end of the third adder provides the second signal.

According to an embodiment of the invention, the signal adjusting unit is configured to decrease the output reference signal for a fifth voltage and then use the output reference signal as the first signal, and decrease the receiving reference signal for a sixth voltage and then use the receiving reference signal as the second signal, the fifth voltage being lower than the sixth voltage.

According to an embodiment of the invention, the signal adjusting unit includes a second subtractor and a third subtractor. A first input end of the second subtractor receives the fifth voltage, a second input end of the second subtractor receives the output reference signal, and an output end of the second subtracter provides the first signal. A first input end of the third subtractor receives the sixth voltage, a second input end of the third subtractor receives the receiving reference signal, and an output end of the third subtractor provides the second signal.

According to an embodiment of the invention, the signal adjusting unit is configured to increase the output reference signal for a seventh voltage and then use the output reference signal as the first signal, and decrease the receiving reference signal for an eighth voltage and then use the receiving reference signal as the second signal.

According to an embodiment of the invention, the signal adjusting unit includes a fourth adder and a fourth subtractor. A first input end of the fourth adder receives the seventh voltage, a second input end of the fourth adder receives the output reference signal, and an output end of the fourth adder provides the first signal. A first input end of the fourth subtractor receives the eighth voltage, a second input end of the fourth subtractor receives the receiving reference signal, and an output end of the fourth subtractor provides the second signal.

According to an embodiment of the invention, the transmitter includes a unit gain amplifier, an input end of the unit gain amplifier receives the output reference signal, and an output end of the unit gain amplifier provides the output signal.

According to an embodiment of the invention, the signal channel is a cable.

According to an embodiment of the invention, the step of adjusting the voltage level of the at least one of the output reference signal and the receiving reference signal by using the signal adjusting unit of the receiver to obtain the first signal and the second signal includes: increasing the output reference signal for a first voltage and then using the output reference signal as the first signal by using the signal adjusting unit; and transmitting and using the receiving reference signal as the second signal by using the signal adjusting unit.

According to an embodiment of the invention, the first voltage is higher than 0 and is lower than an enabling voltage level of the output reference signal.

According to an embodiment of the invention, the step of adjusting the voltage level of the at least one of the output reference signal and the receiving reference signal by using the signal adjusting unit of the receiver to obtain the first signal and the second signal includes: transmitting and using the output reference signal as the first signal by using the signal adjusting unit; and decreasing the receiving reference signal for a second voltage and then using the receiving reference signal as the second signal by using the signal adjusting unit.

According to an embodiment of the invention, the second voltage is higher than 0 and is lower than an enabling voltage level of the output reference signal.

According to an embodiment of the invention, the step of adjusting the voltage level of the at least one of the output reference signal and the receiving reference signal by using the signal adjusting unit of the receiver to obtain the first signal and the second signal includes: increasing the output reference signal for a third voltage and then using the output reference signal as the first signal, and increasing the receiving reference signal for a fourth voltage and then using the receiving reference signal as the second signal by using the signal adjusting unit, wherein the third voltage is higher than the fourth voltage.

According to an embodiment of the invention, a voltage difference between the third voltage and the fourth voltage is higher than 0 and is lower than an enabling voltage level of the output reference signal.

According to an embodiment of the invention, the step of adjusting the voltage level of the at least one of the output reference signal and the receiving reference signal by using the signal adjusting unit of the receiver to obtain the first signal and the second signal includes: decreasing the output reference signal for a fifth voltage and then using the output reference signal as the first signal and decreasing the receiving reference signal for a sixth voltage and then using the receiving reference signal as the second signal by using the signal adjusting unit, wherein the fifth voltage is lower than the sixth voltage.

According to an embodiment of the invention, a voltage difference between the fifth voltage and the sixth voltage is higher than 0 and is lower than an enabling voltage level of the output reference signal.

According to an embodiment of the invention, the step of adjusting the voltage level of the at least one of the output reference signal and the receiving reference signal by using the signal adjusting unit of the receiver to obtain the first signal and the second signal includes: increasing the output reference signal for a seventh voltage and then using the output reference signal as the first signal, and decreasing the receiving reference signal for an eighth voltage and then using the receiving reference signal as the second signal by using the signal adjusting unit.

According to an embodiment of the invention, a total voltage of the seventh voltage and the eighth voltage is higher than 0 and is lower than an enabling voltage level of the output reference signal.

According to an embodiment of the invention, the transceiver is a full duplex transceiver.

According to an embodiment of the invention, the receiving signal corresponds to a difference between the first signal and the second signal.

Based on the above, in the transceiver and the operation method thereof of the invention, the voltage level of at least one of the output reference signal and the receiving reference signal is adjusted to generate the first and second signals having different enabling levels, and a voltage level of the receiving signal is determined based on comparison between the first and second signals. Accordingly, the design of the transceiver of the invention allows signals at the two ends of a channel to have greater amplitudes at two polarities through signal shifting and the comparator circuit, so as to reduce the interference of noises and maintain the signal transmission quality.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
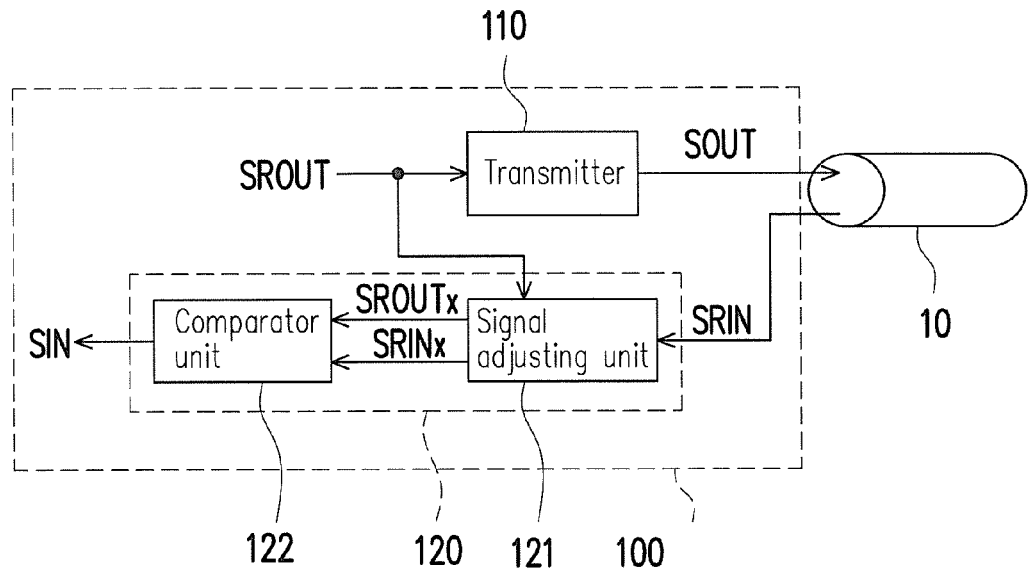
FIG. 1A is a schematic view illustrating a system of a transceiver according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a schematic view illustrating a system of a transceiver according to an embodiment of the invention. Referring to FIG. 1A, in this embodiment, a transceiver 100 is coupled to a signal channel 10 to receive a receiving reference signal SRIN and provide an output signal SOUT. In addition, the signal channel 10 may be a full duplex channel. Namely, the transceiver 100 may be a full duplex transceiver, and the signal channel 10 may be a cable. Moreover, voltage levels of the reference signal SRIN and the output signal SOUT are added to the channel 10.

In this embodiment, the transceiver 100 includes a transmitter 110 and a receiver 120. The transmitter 110 receives an output reference signal SROUT, so as to provide the output signal SOUT to the signal channel 10. In addition, the transmitter 110 may further include an unit gain amplifier. Namely, the transmitter 110 may generate the output signal SOUT through an output buffer. In addition, an input end of the unit gain amplifier receives the output reference signal SROUT, and an output end of the unit gain amplifier provides the output signal SOUT. The receiver 120 receives the receiving reference signal SRIN from the signal channel 10, so as to obtain a receiving signal SIN based on the output reference signal SROUT and the receiving reference signal SRIN.

The receiver 120 includes a signal adjusting unit 121 and a comparator unit 122. The signal adjusting unit 121 adjusts a voltage level of at least one of the output reference signal SROUT and the receiving reference signal SRIN when receiving the output reference signal SROUT and the receiving reference signal SRIN. In addition, the signal adjusting unit 121 correspondingly provides a first signal SROUTx and a second signal SRINx. Namely, enabling levels of the first signal SROUTx and the second signal SRINx may be different. For example, the output reference signal SROUT may serve as the first signal SROUTx after the adjustment, and the receiving reference signal SRIN may serve as the second signal SRINx after the adjustment. However, the embodiments of the invention are not limited thereto.

Then, after the comparator unit 122 receives the first signal SROUTx and the second signal SRINx, the comparator unit 122 compares the first signal SROUTx and the second signal SRINx to obtain the receiving signal SIN. Namely, the receiving signal SIN corresponds to a signed value of a difference between the first signal SROUTx and the second signal SRINx.

In an embodiment of the invention, the signal adjusting unit 121 may include one or more shifters to adjust at least one of the output reference signal SROUT and the receiving reference signal SRIN. In addition, the shifter may be implemented as an adder and/or a subtractor. In addition, the comparator unit 122 may include a comparator. The example is described above for an illustrative purpose. The embodiments of the invention are not limited thereto.

Figure 1B:
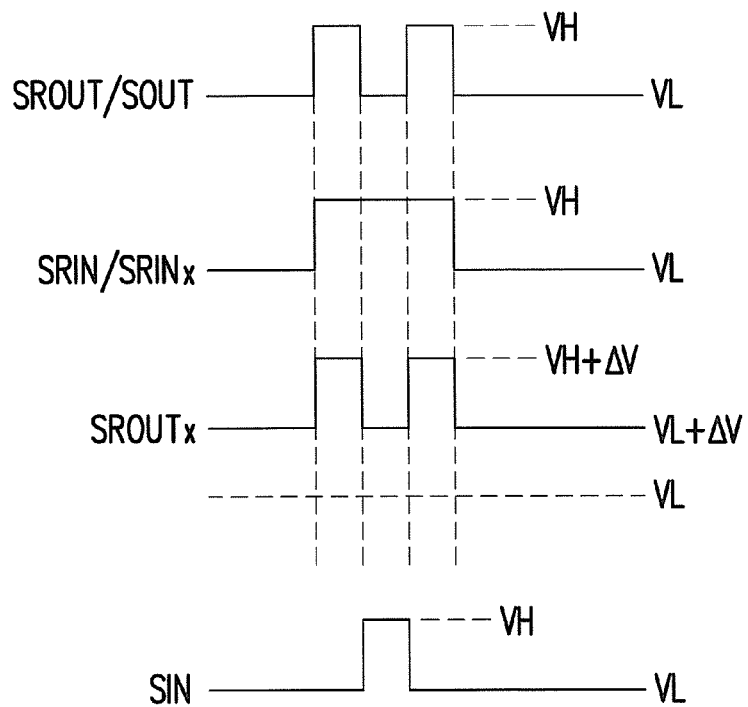
FIG. 1B is a schematic view illustrating a waveform of a transceiver according to an embodiment of the invention.

FIG. 1B is a schematic view illustrating a waveform of a transceiver according to an embodiment of the invention. Referring to FIGS. 1A and 1B, in this embodiment, the output signal SOUT and a signal to be received by the receiver 120 (i.e. the receiving signal SIN) are added to the signal channel 10 to form the receiving reference signal SRIN. In addition, the signal adjusting unit 121 may, for example, regulate the output reference signal SROUT for a shift voltage $\Delta V$ and then use the output reference signal SROUT as the first signal SROUTx, while the receiving reference signal SRIN is not regulated. After the adjustment to the output reference signal SROUT, an enabling voltage level (e.g. VH+$\Delta V$) of the first signal SROUTx is higher than enabling levels (i.e. VH) of other signals. In other words, when a voltage level of the first signal SROUTx is lower than a voltage level of the second signal SRINx, the receiving signal SIN having the enabling level (i.e. VH) may be provided. When the voltage level of the first signal SROUTx is higher than the voltage level of the second signal SRINx, the receiving signal SIN having a disabling level (i.e. VL) may be provided. However, the embodiments of the invention are not limited thereto.

When the shift voltage $\Delta V$ is at a sufficient high level, even if the receiving reference signal SRIN is interfered by noises to make the voltage level slightly change, the enabling level of the first signal SROUTx is still different from that of the second signal SRINx. Thus, the receiver 120 may obtain the correct receiving signal SIN by comparing the first signal SROUTx and the second signal SRINx without being influenced by the interference of noises.

In addition, in the above embodiment, at least one of the output reference signal SROUT and the receiving reference signal SRIN is adjusted to make the enabling level of the first signal SROUTx higher than that of the second signal SRINx. However, in other embodiments, at least one of the output reference signal SROUT and the receiving reference signal SRIN may be adjusted to make the enabling level of the first signal SROUTx lower than the enabling level of the second signal SRINx. Such adjustment may be made by people having ordinary skills in the art, and the embodiments of the invention are not limited thereto.

Figure 2:
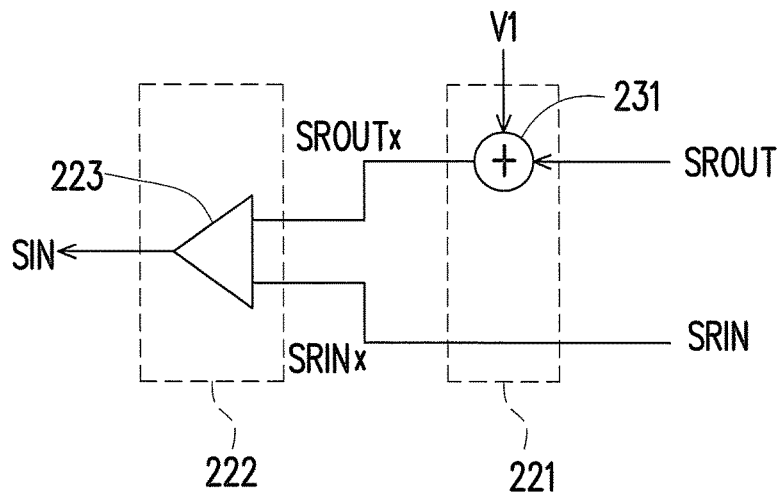
FIG. 2 is a schematic circuit diagram illustrating a receiver according to a first embodiment of the invention.

FIG. 2 is a schematic circuit diagram illustrating a receiver according to a first embodiment of the invention. Referring to FIGS. 1A and 2, like or similar elements are referred to with like or similar reference numerals in the figures. In this embodiment, a signal adjusting unit 221 includes an adder 231 for adjusting the voltage level of the output reference signal SROUT. In addition, the signal adjusting unit 221 directly transmits the reference signal SRIN as the second signal SRINx through a line. More specifically, a first input end and a second input end of the adder 231 respectively receive the output reference signal SROUT and a first voltage V1 to increase the output reference signal SROUT for the first voltage V1 and then output the output reference signal SROUT as the first signal SROUTx at an output end of the adder 231. In addition, the first voltage V1 is higher than 0 and is lower than the enabling voltage level of the output reference signal SROUT (e.g. VH shown in FIG. 1B). A comparator unit 222 includes a comparator 223, for example, and is configured for receiving and comparing the first signal SROUTx and the second signal SRINx, and providing the receiving signal SIN according to an outcome of comparison.

Figure 3:
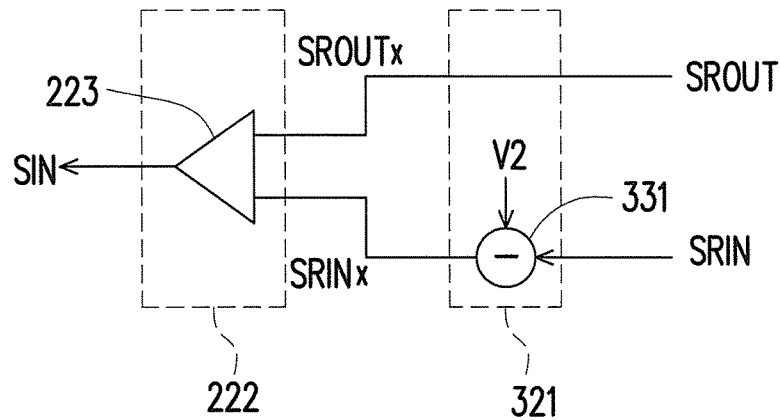
FIG. 3 is a schematic circuit diagram illustrating a receiver according to a second embodiment of the invention.

FIG. 3 is a schematic circuit diagram illustrating a receiver according to a second embodiment of the invention. Referring to FIGS. 1A, 2 and 3, like or similar elements are referred to with like or similar reference numerals in the figures. In this embodiment, a signal adjusting unit 321 includes a subtractor 331 for adjusting the voltage level of the receiving reference signal SRIN. In addition, the signal adjusting unit directly transmits the output reference signal SROUT as the first signal SROUTx through a line. More specifically, a first input end and a second input end of the subtractor 331 respectively receive the receiving reference signal SRIN and a second voltage V2 to decrease the receiving reference signal SRIN for the second voltage V2 and then output the receiving reference signal SRIN as the second signal SRINx at an output end of the subtractor 331. In addition, the second voltage V2 is higher than 0 and is lower than the enabling voltage level of the outputting reference signal SROUTx (e.g. VH shown in FIG. 1B).

Figure 4:
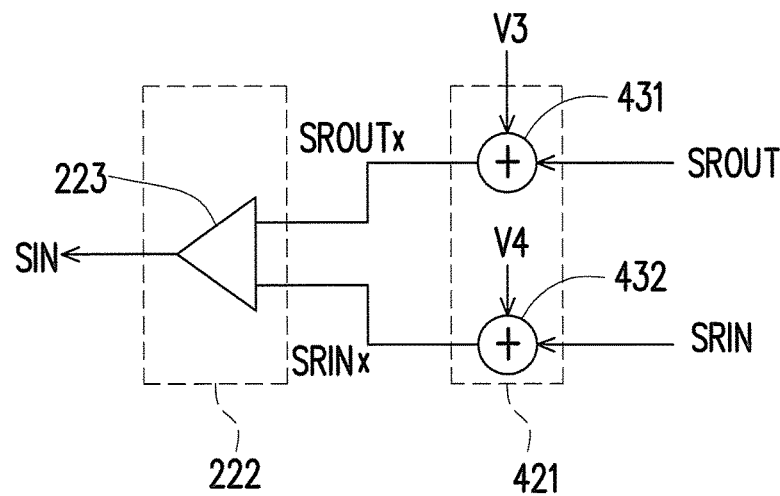
FIG. 4 is a schematic diagram illustrating a circuit of a receiver according to a third embodiment of the invention.

FIG. 4 is a schematic circuit diagram illustrating a receiver according to a third embodiment of the invention. Referring to FIGS. 1A, 2 and 4, like or similar elements are referred to with like or similar reference numerals in the figures. In this embodiment, a signal adjusting unit 421 includes adders 431 and 432 for adjusting the voltage levels of the output reference signal SROUT and the receiving reference signal SRIN. More specifically, a first input end and a second input end of the adder 431 respectively receive the output reference signal SROUT and the third voltage V3 to increase the output reference signal SROUT for the third voltage V3 and then output the output reference voltage SROUT as the first signal SROUTx at an output end of the adder 431. A first input end and a second input end of the adder 432 respectively receive the receiving reference signal SRIN and a fourth voltage V4 to increase the receiving reference signal SRIN for the fourth voltage V4 and than output the receiving reference signal SRIN as the second signal SRINx at an output end of the adder 432. In addition, the third voltage V3 is higher than the fourth voltage V4, and a voltage difference between the third voltage V3 and the fourth voltage V4 is higher than 0 and lower than the enabling voltage level of the output reference signal SROUT (e.g. VH shown in FIG. 1B).

Figure 5:
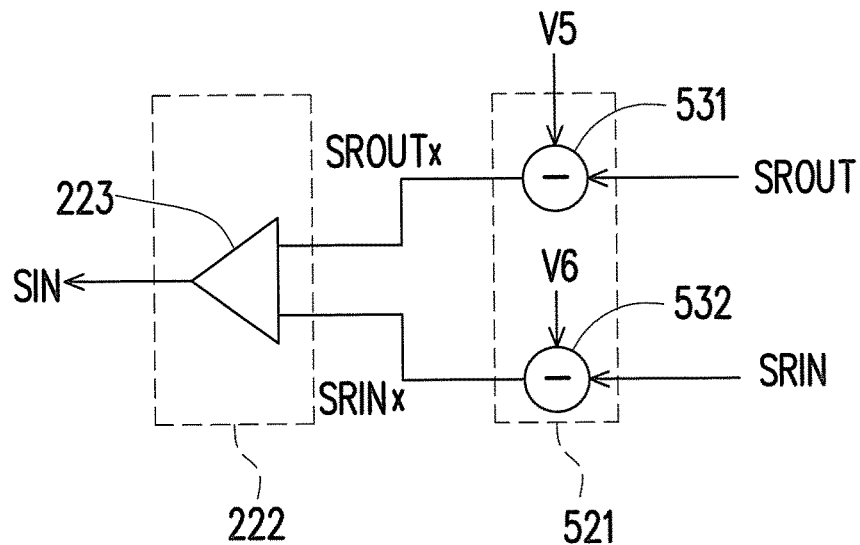
FIG. 5 is a schematic circuit diagram illustrating a receiver according to a fourth embodiment of the invention.

FIG. 5 is a schematic circuit diagram illustrating a receiver according to a fourth embodiment of the invention. Referring to FIGS. 1A, 2 and 5, like or similar elements are referred to with like or similar reference numerals in the figures. In this embodiment, a signal adjusting unit 521 includes subtractors 531 and 532 for adjusting the voltage levels of the output reference signal SROUT and the receiving reference signal SRIN. More specifically, a first input end and a second input end of the subtractor 531 respectively receive the output reference signal SROUT and a fifth voltage V5 to decrease the output reference signal SROUT for the fifth voltage V5 and then output the output reference signal SROUT as the first signal SROUTx at an output end of the subtractor 531. A first input end and a second input end of the subtractor 532 respectively receive the receiving reference signal SRIN and a sixth voltage V6 to decrease the receiving reference signal SRIN for the sixth voltage V6 and then output the receiving reference signal SRIN as the second signal SRINx at an output end of the subtractor 532. In addition, the fifth voltage V5 is lower than the sixth voltage V6, and a voltage difference between the fifth voltage V5 and the sixth voltage V6 is higher than 0 and lower than the enabling voltage level of the output reference signal SROUT (e.g. VH shown in FIG. 1B).

Figure 6:
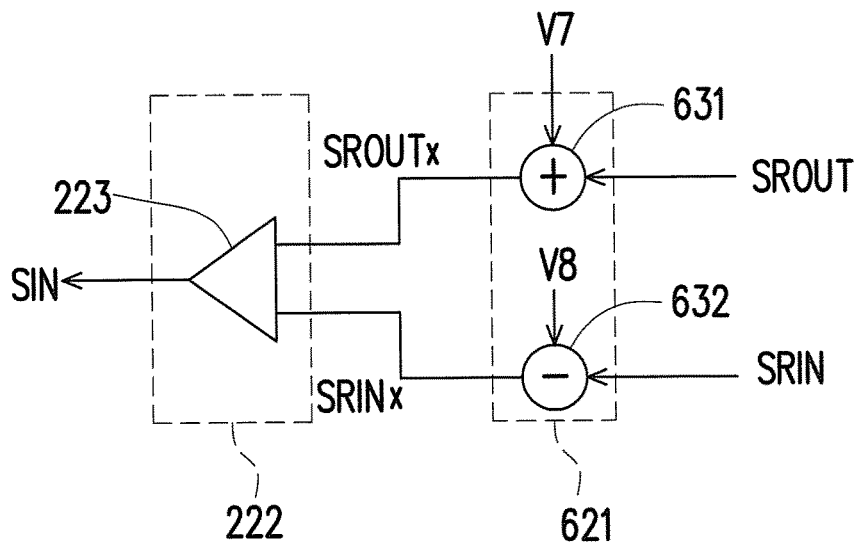
FIG. 6 is a schematic circuit diagram illustrating a receiver according to a fifth embodiment of the invention.

FIG. 6 is a schematic circuit diagram illustrating a receiver according to a fifth embodiment of the invention. Referring to FIGS. 1A, 2 and 6, like or similar elements are referred to with like or similar reference numerals in the figures. In this embodiment, a signal adjusting unit 621 includes an adder 631 and a subtractor 632 for adjusting the voltage levels of the output reference signal SROUT and the receiving reference signal SRIN. More specifically, a first input end and a second input end of the adder 631 respectively receive the output reference signal SROUT and a seventh voltage V7 to increase the output reference signal SROUT for the seventh voltage V7 and then output the output reference signal SROUT as the first signal SROUTx at an output end of the adder 631. A first input end and a second input end of the subtractor 632 respectively receive the receiving reference signal SRIN and the eighth voltage V8 to decrease the receiving reference signal SRIN for the eighth voltage V8 and then output the receiving reference signal SRIN as the second signal SRINx at an output end of the subtractor 632. In addition, a total voltage of the seventh voltage V7 and the eighth voltage V8 is higher than 0 and is lower than the enabling voltage level of the output reference signal SROUT (e.g. VH shown in FIG. 1B).

Figure 7:
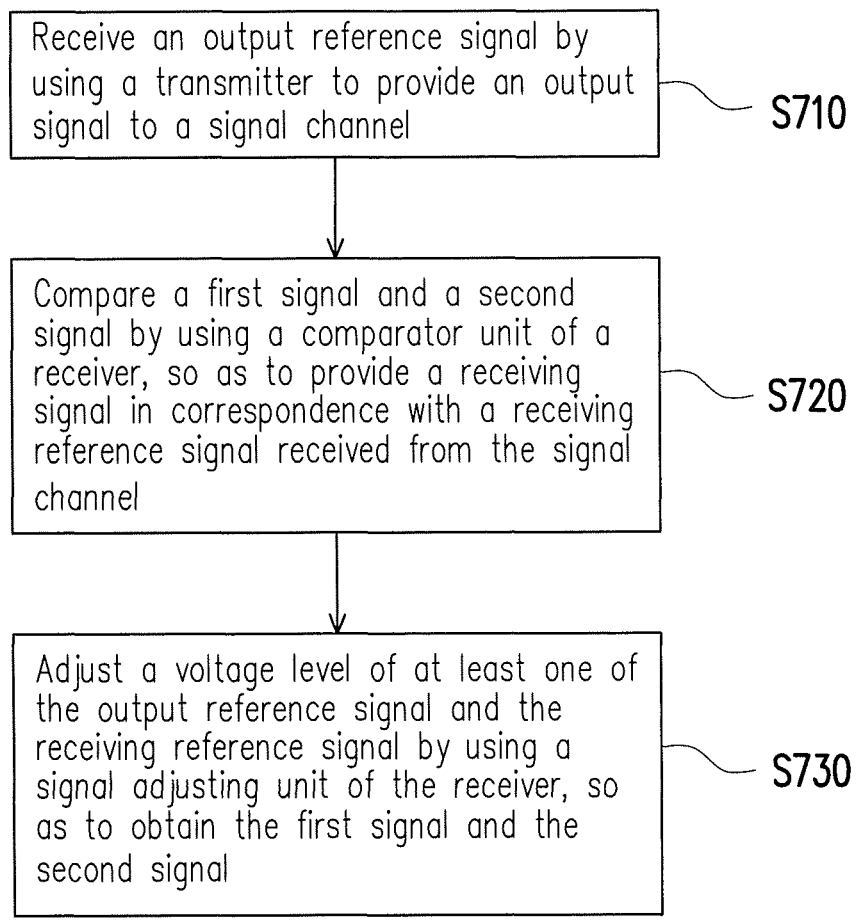
FIG. 7 is a flowchart illustrating an operation method of a transceiver according to an embodiment of the invention.

FIG. 7 is a flowchart illustrating an operation method of a transceiver according to an embodiment of the invention. Referring to FIG. 7, in this embodiment, the operation method of the transceiver includes steps as follows. At Step S710, an output reference signal is received by a transmitter to provide an output signal to a signal channel. At Step 720, a first signal and a second signal are compared by using a comparator unit of a receiver, so as to provide a receiving signal in correspondence with a receiving reference signal received from the signal channel. At Step S730, a voltage level of at least one of the output reference signal and the receiving reference signal is adjusted by using a signal adjusting unit of the receiver, so as to obtain the first signal and the second signal. In addition, a sequence of steps S710, S720, and S730 is only described above for an illustrative purpose, and the embodiments of the invention are not limited thereto. Also, details with respect to steps S710, S720, and S730 may be referred to with reference to the embodiments shown in FIGS. 1A, 1B, and 2 to 6. Therefore, no further details in this respect will be reiterated below.

In view of the foregoing, the transceiver of the invention allows signals at the two ends of the channel to have greater amplitudes at the polarities through the comparator circuit and signal shifting, so as to reduce the interference of noises while maintain the signal transmission quality at the two ends.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transceiver, comprising:
    a transmitter, configured to receive an output reference signal to provide an output signal to a signal channel; and
    a receiver, coupled to the signal channel to receive a receiving reference signal, so as to provide a receiving signal, wherein the receiver comprises:
        a comparator unit, configured to compare a first signal and a second signal to obtain the receiving signal; and
        a signal adjusting unit, coupled between the output reference signal, the receiving reference signal, and the comparator unit to adjust a voltage level of at least one of the output reference signal and the receiving reference signal, thereby obtaining the first signal and the second signal, wherein the first signal is the output reference signal or the output reference signal with an adjusted voltage level, and the second signal is the receiving reference signal or the receiving reference signal with an adjusted voltage level.

2. The transceiver as claimed in claim 1, wherein the signal adjusting unit is configured to increase the output reference signal with a first voltage and then use the adjusted output reference signal as the first signal and transmit the receiving reference signal as the second signal.

3. The transceiver as claimed in claim 2, wherein the signal adjusting unit comprises:
    a first adder, wherein a first input end of the first adder receives the first voltage, a second input end of the first adder receives the output reference signal, and an output end of the first adder provides the first signal.

4. The transceiver as claimed in claim 2, wherein the first voltage is higher than 0 and is lower than an enabling voltage level of the output reference signal.

5. The transceiver as claimed in claim 1, wherein the signal adjusting unit is configured to transmit the output reference signal as the first signal, and decrease the receiving reference signal with a first voltage and then use the adjusted receiving reference signal as the second signal.

6. The transceiver as claimed in claim 5, wherein the signal adjusting unit comprises:
a first subtractor, wherein a first input end of the first subtractor receives the second voltage, a second input end of the first subtractor receives the receiving reference signal, and an output end of the first subtractor provides the second signal.

7. The transceiver as claimed in claim 5, wherein the second voltage is higher than 0 and is lower than an enabling voltage level of the output reference signal.

8. The transceiver as claimed in claim 1, wherein the signal adjusting unit is configured to increase the output reference signal with a first voltage and then use the adjusted output reference signal as the first signal, and increase the receiving reference signal with a second voltage and then use the adjusted receiving reference signal as the second signal, the first voltage being higher than the second voltage.

9. The transceiver as claimed in claim 8, wherein the signal adjusting unit comprises:
a first adder, wherein a first input end of the first adder receives the first voltage, a second input end of the first adder receives the output reference signal, and an output end of the first adder provides the first signal; and
a second adder, wherein a first input end of the second adder receives the second voltage, a second input end of the second adder receives the receiving reference signal, and an output end of the second adder provides the second signal.

10. The transceiver as claimed in claim 9, wherein a voltage difference between the first and the second voltages is higher than 0 and is lower than an enabling voltage level of the output reference signal.

11. The transceiver as claimed in claim 1, wherein the signal adjusting unit is configured to decrease the output reference signal with a first voltage and then use the adjusted output reference signal as the first signal, and decrease the receiving reference signal with a second voltage and then use the adjusted receiving reference signal as the second signal, the first voltage being lower than the second voltage.

12. The transceiver as claimed in claim 11, wherein the signal adjusting unit comprises:
a first subtractor, wherein a first input end of the first subtractor receives the first voltage, a second input end of the first subtractor receives the output reference signal, and an output end of the first subtractor provides the first signal; and
a second subtractor, wherein a first input end of the second subtractor receives the second voltage, a second input end of the second subtractor receives the receiving reference signal, and an output end of the second subtractor provides the second signal.

13. The transceiver as claimed in claim 11, wherein a voltage difference between the first voltage and the second voltage is higher than 0 and is lower than an enabling voltage level of the output reference signal.

14. The transceiver as claimed in claim 1, wherein the signal adjusting unit is configured to increase the output reference signal with a first voltage and then use the adjusted output reference signal as the first signal, and decrease the receiving reference signal with a second voltage and then use the adjusted receiving reference signal as the second signal.

15. The transceiver as claimed in claim 14, wherein the signal adjusting unit comprises:
a first adder, wherein a first input end of the first adder receives the first voltage, a second input end of the first adder receives the output reference signal, and an output end of the first adder provides the first signal; and
a first subtractor, wherein a first input end of the first subtractor receives the second voltage, a second input end of the first subtractor receives the receiving reference signal, and an output end of the first subtractor provides the second signal.

16. The transceiver as claimed in claim 14, wherein a total voltage of the first voltage and the second voltage is higher than 0 and is lower than an enabling voltage level of the output reference signal.

17. The transceiver as claimed in claim 1, wherein the transmitter comprises an unit gain amplifier, an input end of the unit gain amplifier receives the output reference signal, and an output end of the unit gain amplifier provides the output signal.

18. The transceiver as claimed in claim 1, wherein the signal channel is a cable.

19. The transceiver as claimed in claim 1, wherein the transceiver is a full duplex transceiver.

20. The transceiver as claimed in claim 1, wherein the receiving signal corresponds to a difference between the first signal and the second signal.

21. An operation method of a transceiver, comprising:
receiving an output reference signal by using a transmitter to provide an output signal to a signal channel;
comparing a first signal and a second signal by using a comparator unit of a receiver, so as to provide a receiving signal in correspondence with a receiving reference signal received from the signal channel; and
adjusting a voltage level of at least one of the output reference signal and the receiving reference signal by using a signal adjusting unit of the receiver to obtain the first signal and the second signal,
wherein the first signal is the output reference signal or the output reference signal with an adjusted voltage level, and the second signal is the receiving reference signal or the receiving reference signal with an adjusted voltage level.

22. The operation method of the transceiver as claimed in claim 21, wherein the step of adjusting the voltage level of the at least one of the output reference signal and the receiving reference signal by using the signal adjusting unit of the receiver to obtain the first signal and the second signal comprises:
increasing the output reference signal with a first voltage and then using the adjusted output reference signal as the first signal by using the signal adjusting unit; and
transmitting and using the receiving reference signal as the second signal by using the signal adjusting unit.

23. The operation method of the transceiver as claimed in claim 22, wherein the first voltage is higher than 0 and is lower than an enabling voltage level of the output reference signal.

24. The operation method of the transceiver as claimed in claim 21, wherein the step of adjusting the voltage level of the at least one of the output reference signal and the receiving reference signal by using the signal adjusting unit of the receiver to obtain the first signal and the second signal comprises:

transmitting and using the output reference signal as the first signal by using the signal adjusting unit; and decreasing the receiving reference signal with a first voltage and then using the adjusted receiving reference signal as the second signal by using the signal adjusting unit.

25. The operation method of the transceiver as claimed in claim 24, wherein the second voltage is higher than 0 and is lower than an enabling voltage level of the output reference signal.

26. The operation method of the transceiver as claimed in claim 21, wherein the step of adjusting the voltage level of the at least one of the output reference signal and the receiving reference signal by using the signal adjusting unit of the receiver to obtain the first signal and the second signal comprises:

increasing the output reference signal with a first voltage and then using the adjusted output reference signal as the first signal, and increasing the receiving reference signal with a second voltage and then using the adjusted receiving reference signal as the second signal by using the signal adjusting unit, wherein the first voltage is higher than the second voltage.

27. The operation method of the transceiver as claimed in claim 26, wherein a voltage difference between the first voltage and the second voltage is higher than 0 and is lower than an enabling voltage level of the output reference signal.

28. The operation method of the transceiver as claimed in claim 21, wherein the step of adjusting the voltage level of the at least one of the output reference signal and the receiving reference signal by using the signal adjusting unit of the receiver to obtain the first signal and the second signal comprises:

decreasing the output reference signal with a first voltage and then using the adjusted output reference signal as the first signal and decreasing the receiving reference signal with a second voltage and then using the adjusted receiving reference signal as the second signal by using the signal adjusting unit, wherein the first voltage is lower than the second voltage.

29. The operation method of the transceiver as claimed in claim 28, wherein a voltage difference between the first voltage and the second voltage is higher than 0 and is lower than an enabling voltage level of the output reference signal.

30. The operation method of the transceiver as claimed in claim 21, wherein the step of adjusting the voltage level of the at least one of the output reference signal and the receiving reference signal by using the signal adjusting unit of the receiver to obtain the first signal and the second signal comprises:

increasing the output reference signal with a first voltage and then using the adjusted output reference signal as the first signal, and decreasing the receiving reference signal with a second voltage and then using the adjusted receiving reference signal as the second signal by using the signal adjusting unit.

31. The operation method of the transceiver as claimed in claim 30, wherein a total voltage of the first voltage and the second voltage is higher than 0 and is lower than an enabling voltage level of the output reference signal.

32. The operation method of the transceiver as claimed in claim 21, wherein the transceiver is a full duplex transceiver.

33. The operation method of the transceiver as claimed in claim 21, wherein the receiving signal corresponds to a difference between the first signal and the second signal.

* * * * *